United States Patent
Barish et al.

(10) Patent No.: US 12,468,909 B2
(45) Date of Patent: Nov. 11, 2025

(54) USE OF DISTANCE MEASUREMENT TO AID IN VISION APPLICATIONS IN HANDHELD SCANNER DEVICES

(71) Applicant: ZEBRA TECHNOLOGIES CORPORATION, Lincolnshire, IL (US)

(72) Inventors: Justin F. Barish, Kings Park, NY (US); Matthew Lawrence Horner, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/113,757

(22) Filed: Feb. 24, 2023

(65) Prior Publication Data

US 2024/0289569 A1    Aug. 29, 2024

(51) Int. Cl.
*G06K 7/10* (2006.01)
*G06K 7/14* (2006.01)

(52) U.S. Cl.
CPC ..... *G06K 7/10722* (2013.01); *G06K 7/10881* (2013.01); *G06K 7/1413* (2013.01); *G06K 7/1417* (2013.01); *G06K 2007/10524* (2013.01)

(58) Field of Classification Search
CPC ........... G06K 7/10722; G06K 7/10881; G06K 7/1413; G06K 7/1417; G06K 2007/10524
See application file for complete search history.

(56) References Cited

U.S. PATENT DOCUMENTS

| | | | |
|---|---|---|---|
| 2008/0011856 A1* | 1/2008 | Bremer | G06K 7/14 235/462.07 |
| 2019/0236796 A1 | 8/2019 | Blasco Claret et al. | |
| 2020/0034591 A1* | 1/2020 | Bachelder | G06K 7/1413 |
| 2020/0104594 A1 | 4/2020 | Zucker et al. | |
| 2020/0279310 A1 | 9/2020 | Kundu et al. | |
| 2021/0157998 A1 | 5/2021 | Rodriguez et al. | |
| 2021/0279436 A1 | 9/2021 | Barkan et al. | |
| 2021/0374373 A1 | 12/2021 | Astvatsaturov et al. | |

OTHER PUBLICATIONS

International Search Report and Written Opinion for International Application No. PCT/US2024/14245 mailed on May 10, 2024.

* cited by examiner

*Primary Examiner* — Matthew Mikels
(74) *Attorney, Agent, or Firm* — Yuri Astvatsaturov

(57) ABSTRACT

Imaging devices, systems, and methods for capturing and processing images for vision applications in a non-fixed environment are described herein. An example device includes: a housing, a depth sensor operable to detect that an object in a range field of view is within a predetermined range from the device, an imaging sensor operable to capture images of an object, and one or more processors that: detect that the object is within the predetermined range in the range FOV; identify a first subset of images in a plurality of images captured by the imaging sensor for generating an identity for the object; and attempt to perform, using a second subset of images in the plurality of images, a decode event for an indicia associated with the object, the indicia visible in the imaging FOV for the second subset of images.

30 Claims, 8 Drawing Sheets

USE OF DISTANCE MEASUREMENT TO AID IN VISION APPLICATIONS IN HANDHELD SCANNER DEVICES

BACKGROUND

Barcode reading systems have long been used to capture barcode data, which is then used to look up information regarding the item in question. More recently, barcode reading systems have also been used for broader machine vision purposes, such as object recognition, detecting ticket switching, etc. However, fixed-place and/or bioptic scanners are generally used for such purposes, due to the stability, fixed distance between the item and the scanner, and reduced chance of human error. Handheld barcode reading systems may see other items that a fixed-place scanner often would not but introduce unique problems for machine vision applications by their nature. For example, handheld barcode reading systems are constantly moving, may undergo a shift in position when a user pulls a trigger or presses a button, and may be moved by the user too close to capture an image for machine vision purposes. As such, a system that is able to automatically determine when an item is within a range for image capturing and subsequently capture images for further machine vision applications is desired.

SUMMARY

In an embodiment, a handheld imaging device for capturing images for vision applications in a non-fixed environment is provided. The system includes: an imaging device configured to operate in at least a handheld mode and a presentation mode, the imaging device including: a housing; a depth sensor operable to detect that an object in a range field of view (FOV) of the depth sensor is within a predetermined range from the handheld imaging device; and an imaging sensor at least partially disposed within the housing and operable to capture images of the object within an imaging FOV of the imaging sensor. The system further includes one or more processors and a computer-readable media storing machine readable instructions that, when executed, cause the one or more processors to: (i) detect, using the depth sensor, that the object is within the predetermined range in the range FOV; (ii) responsive to detecting that the object is within the predetermined range, identify a first subset of images in a plurality of images captured by the imaging sensor for an object identification image process for generating an identity for the object, wherein identifying the first subset of images is based on whether the object is within the predetermined range for each of the plurality of images; and (iii) after the detecting, attempt to perform, using a second subset of images in the plurality of images, a decode event for an indicia associated with the object, the indicia visible in the imaging FOV for the second subset of images.

In a variation of the embodiment, (a) the identity for the object is a first identity for the object; (b) the object identification image process includes analyzing a first image of the first subset of images to generate the first identity for the object; and (c) the computer-readable media further stores instructions that, when executed, cause the one or more processors to: (i) decode the indicia to generate a second identity for the object, the indicia visible in a second image of the second subset of images; and (ii) compare the first identity for the object to the second identity for the object to determine whether the first identity matches the second identity.

In another variation of the embodiment, the computer-readable media further stores instructions that, when executed, cause the one or more processors to: responsive to determining that the first identity does not match the second identity, provide an alert to a user associated with the handheld imaging device.

In yet another variation of the embodiment, the second image is captured responsive to a trigger event and the first image is captured prior to the trigger event.

In still yet another variation of the embodiment, the first image is captured responsive to the detecting that the object is within the predetermined range and the computer-readable media further stores instructions that, when executed, cause the one or more processors to: store, in a buffer of the handheld imaging device, the first image after the first image is captured; wherein the object identification image process is responsive to the trigger event.

In another variation of the embodiment, a third image is captured responsive to a trigger event, the first image and the second image are captured prior to the trigger event, and the computer-readable media further stores instructions that, when executed, cause the one or more processors to: store, in a buffer of the handheld imaging device, the first image after the first image is captured and the second image after the second image is captured; wherein the object identification image process is responsive to the trigger event.

In yet another variation, the identity for the object is a first identity for the object and the object identification image process includes: analyzing a first image of the first subset of images to generate the first identity for the object; and the computer-readable media further stores instructions that, when executed, cause the one or more processors to: determine that a second identity for the object is not generated from the decode event or will not be generated from the decode event.

In yet another variation, the computer-readable media further stores instructions that, when executed, cause the one or more processors to: responsive to determining that the second identity is not generated or will not be generated, provide an alert to a user associated with the handheld imaging device.

In still yet another variation, the computer-readable media further stores instructions that, when executed, cause the one or more processors to: decode the indicia to generate the identity for the object.

In another variation, the object identification image process includes: transmitting the first subset of images to a computing device for training a machine learning model.

In yet another variation, the computer-readable media further stores instructions that, when executed, cause the one or more processors to: transmit the first image, the first identity, the second image, the second identity, and the determination of whether the first identity matches the second identity to a computing device for training a machine learning model.

In still yet another variation, detecting that the object is within the predetermined range includes: determining that a predetermined number of pixels in the range FOV satisfy a predetermined range value threshold.

In another variation, the predetermined number of pixels in the range FOV is a predetermined number of contiguous pixels in the range FOV.

In yet another variation, the computer-readable media further stores instructions that, when executed, cause the one or more processors to: identify a location in the range FOV where the object would enter the imaging FOV; wherein the detecting that the object is within the predetermined range is responsive to detecting a presence of the object in the location.

In still yet another variation, detecting that the object is within the predetermined range includes: calculating, using the depth sensor, a time of flight (TOF) value for light transmitted from the handheld imaging device to the object; and determining, based on the TOF value, a distance from the handheld imaging device to the object.

In another embodiment, a method for capturing images for vision applications in a non-fixed environment is provided. The method includes: (i) detecting, by one or more processors and using a depth sensor associated with a handheld imaging device, that an object in a range field of view (FOV) of the depth sensor is within a predetermined range from the handheld imaging device; (ii) responsive to the detecting, identifying, by the one or more processors, a first subset of images in a plurality of images captured by an imaging sensor for an object identification image process for generating an identity for the object, the identifying based on whether the object is within the predetermined range for each of the plurality of images, the imaging sensor operable to capture an image of the object within an imaging FOV of an imaging sensor; and (iii) after the detecting, attempting, by the one or more processors, to perform, using a second subset of images in the plurality of images, a decode event for an indicia associated with the object, the indicia visible in the imaging FOV for the second subset of images.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
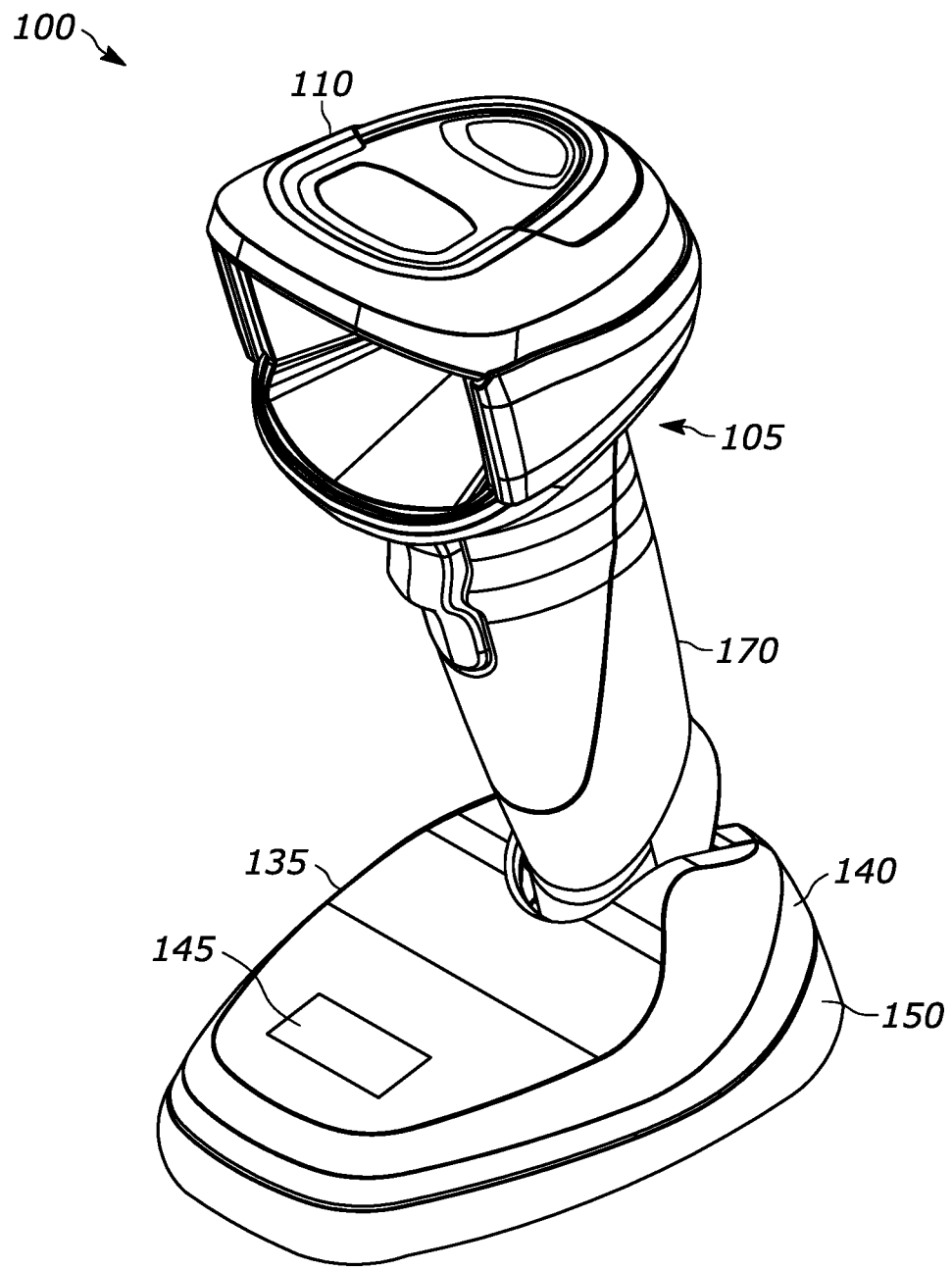
FIG. 1A illustrates a perspective view of a first example handheld barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some modern barcode readers are capable of using imaging sensors (referred to herein as "imagers") for reading barcodes and additional imagers (e.g., color cameras) for machine vision purposes. However, many of these modern barcode readers are fixed barcode readers to simplify the process. By using fixed barcode readers, the number of products eligible for machine vision applications are then limited to those able to be placed on a plate of a fixe barcode scanner. Handheld barcode readers, however, introduce additional problems in making efficient use of such for machine vision applications that may not exist for fixed barcode readers (e.g., bioptic scanners, dual platter scanners, etc.).

In particular, handheld barcode readers are moved to the object rather than having the object be placed on a plate located a fixed distance from the actual imager, leading to possible difficulties in the system determining when an object is within a clear image capture range. Further, a handheld barcode reader is held steady by human hands, which may naturally shift or twitch, particularly when pulling a trigger or pressing a button, leading to shifts that may make the resultant images difficult for performing machine vision analysis. Moreover, a human user may not actually activate the scan until the reader is too close to perform machine vision analysis. Similarly, keeping the additional imagers constantly recording may drain battery life for a handheld barcode reader.

The example handheld barcode readers disclosed herein include a depth sensor to detect the distance between the barcode reader and the item being scanned. In particular, the handheld barcode reader uses the readings from the depth sensor to determine when an item is within a predetermined range (e.g., where the barcode reader is likely to get a clear image of enough characteristics to identify the item). The handheld barcode reader may then begin capturing images (e.g., via the additional imager(s)) to use in machine vision applications, such as detecting activity from bad-faith actors (e.g., ticket switching, sweethearting, scan avoidance, etc.), recognizing objects without traditional scanning indicia (e.g., produce recognition), general object recognition (e.g., for comparison to an identity determined by decoding a barcode or other indicia), training a machine learning model to perform such tasks, and any other similar such machine vision application.

The example handheld barcode readers use a depth sensor to determine a distance between the barcode reader and the item being scanned. In particular, the depth sensor may act as a time of flight (TOF) sensor by emitting light towards an object in a FOV. The object then reflects the light back toward the depth sensor (e.g., following a substantially similar path), which receives the reflected light and determines the time the light spent traveling between the handheld barcode reader and the object (e.g., a time of flight (TOF) value). Based on such a TOF value, the handheld barcode reader may then calculate the distance between the handheld barcode reader and the item.

By using a depth sensor to determine the distance between the handheld barcode reader and an item to be scanned and subsequently using the distance to determine when to operate the additional imager, the exemplary handheld barcode readers described herein improve the battery life of the device by reducing unnecessary imaging while improving the ability for the device to perform machine vision applications, as described herein. Moreover, because only a few images may need to be analyzed rather than an infinite stream, a system implementing the techniques described herein may further improve the processing speed and computing power used.

Figure 1B:
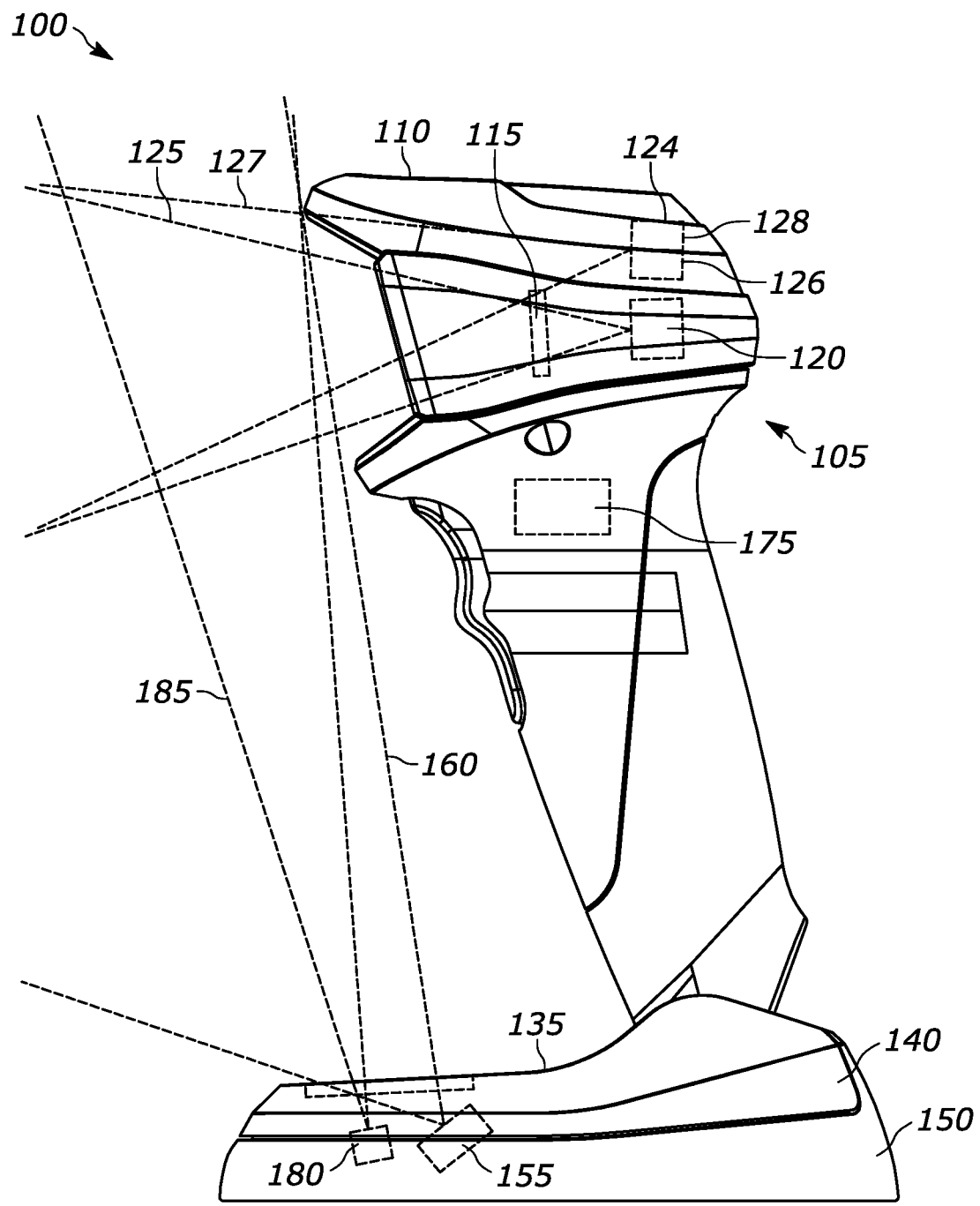
FIG. 1B illustrates a side view of the handheld barcode reader of FIG. 1A.
Figure 1C:
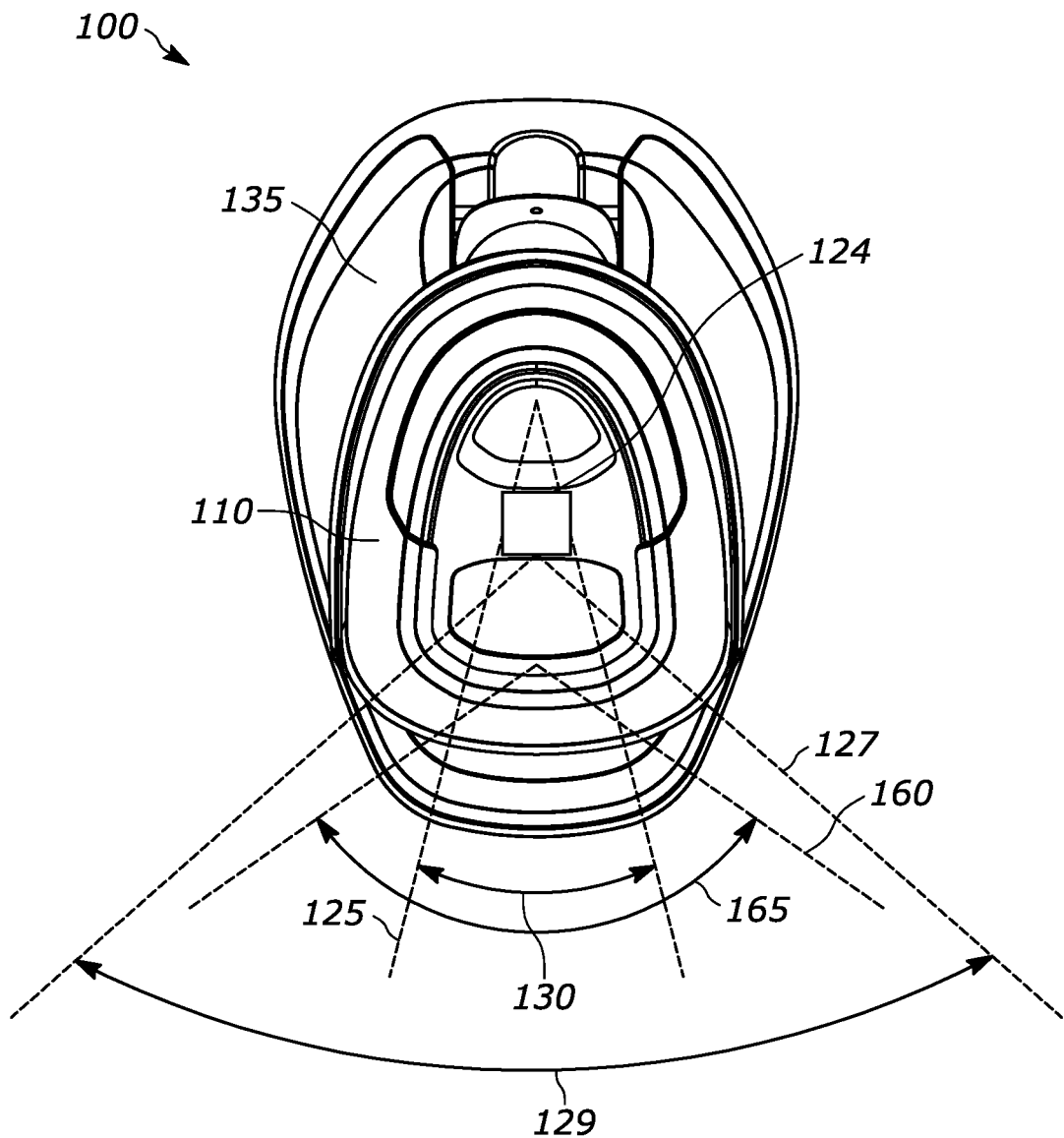
FIG. 1C illustrates a top view of the handheld barcode reader of FIG. 1A.

Referring to FIGS. 1A-1C, a first example handheld imaging device 100 is illustrated. Handheld imaging device 100 generally includes a housing 105 having a head portion 110 and a base portion 135. Base portion 135 includes an upper portion 140, a lower portion 150 removably attached to upper portion 140, and a base window 145 formed in upper portion 140. While lower portion 150 is shown as being separable from upper portion 140 in a horizontal direction, the separation between lower portion 150 and upper portion 140 could be vertical or in any other direction appropriate for a particular application. In the particular example shown, housing 105 also has a handle portion 170 positioned between head portion 110 and base portion 135 and configured to be grasped by the hand of a user.

A vision camera 155 is positioned within base portion 135 and has a first field-of-view (FOV) 160 that is directed out of base window 145 in upper portion 140 of base portion 135. Preferably, an area adjacent a front of handle portion 170 (e.g., within 10 mm of the front of handle portion 170 or within a finger's width of the front of handle portion 170) is visible in first FOV 160, which can be used to determine if a user is gripping handle portion. In the example shown, vision camera 155 is configured to capture images to perform functions such as facial recognition, gesture recognition, product identification, scan avoidance, ticket switching, etc.

A barcode reading module 120 is positioned at least partially in head portion 110 and has a second FOV 125 that is directed through a scan window 115 in head portion 110 and can at least partially overlap first FOV 160. Depending on the implementation, the barcode reading module 120 and the vision camera 155 may utilize the same lens assembly and/or the same imaging sensor. In other implementations, the barcode reading module 120 and the vision camera 155 may utilize different imaging sensors, such as a monochromatic sensor and a color sensor, respectively.

A depth sensor device 124 is similarly positioned at least partially in head portion 110 and has a depth FOV 127 that may similarly be directed through the scan window 115. In some implementations, the depth FOV 127 may at least partially overlap first FOV 160 and/or second FOV 125. In some implementations, the depth sensor device 124 includes an illumination light source 128 and one or more sensors 126, the functionality of which is described in more detail with regard to FIG. 2B below. Depending on the implementation, the depth sensor device 124 is instead positioned on top of the head portion 110, below the head portion 110, and/or otherwise exterior to the housing 105 (e.g., as an external add-on piece).

A controller 175 is also positioned within housing 105 and is in communication with barcode reading module 120, vision camera 155, and/or depth sensor device 124. Controller 175 is configured to decode process signals from barcode reading module 120 from barcodes that are read by barcode reading module 120 and to receive and process images captured by and received from vision camera 155, as discussed above. In some implementations, controller 175 is also configured to synchronize barcode reading module 120 and vision camera 155 so that vision camera 155 does not capture images when barcode reading module 120 is active or so that both vision camera 155 and barcode reading module 120 capture images in tandem, depending on the implementation. Controller 175 can synchronize barcode reading module 120 and vision camera 155 based on images captured by vision camera 155 or handheld imaging device 100 could have an optical sensor 180 that is positioned in base portion 135, is in communication with controller 175, and has a third FOV 185 that at least partially overlaps second FOV 125 of barcode reading module 120 to determine when barcode reading module 120 is active. Controller 175 can then be configured to receive signals from optical sensor 180 indicating whether or not barcode reading module 120 is active and synchronize vision camera 155 and barcode reading module 120 based on the signals received from optical sensor 180. Alternatively, controller 175 could be configured to synchronize vision camera 155 and barcode reading module 120 to activate simultaneously so that vision camera 155 can use the same illumination as barcode reading module 120. In some implementations, controller 175 is configured to cause vision camera 155 and/or barcode reading module 120 to activate responsive to receiving an indication from depth sensor device 124. Alternatively, controller 175 may be configured to cause depth sensor device 124 to activate responsive to receiving an indication from vision camera 155 and/or barcode reading module 120.

As best shown in FIG. 1C, first FOV 160 of vision camera 155 has a horizontal viewing angle 165 that is larger than the horizontal viewing angle 130 of second FOV 125 of barcode reading module 120. For example, horizontal viewing angle 165 of first FOV 160 could be between 80 degrees and 120 degrees and is preferably 100 degrees. In addition, horizontal viewing angle 130 of second FOV 125 could be between 40 degrees and 60 degrees. With horizontal viewing angle 165 of first FOV 160 of vision camera 155 being wider than horizontal viewing angle 130 of second FOV 125 of barcode reading module 120, vision camera 155 can be used as a wake-up system and controller 175 can be configured to turn on barcode reading module 120 when an object is detected in first FOV 160 of vision camera 155, before the object reaches second FOV 125 of barcode reading module 120. This allows barcode reading module 120 to be active as the object enters second FOV 125 and allows more time for barcode reading module 120 to read and decode a barcode on the object.

Depending on the implementation, the horizontal viewing angle 129 of the depth FOV 127 may be larger than the horizontal viewing angle 165 of the first FOV 160 or the horizontal viewing angle 130 of the second FOV 125. In particular, when an object appears in the depth FOV 127, the depth sensor device 124 may emit light to determine the distance between the object and the handheld imaging device 100 as described in more detail below with regard to FIG. 2B. In further implementations, the vision camera 155 and/or the barcode reading module 120 activates and/or begins capturing images responsive to a determination that the object is within a predetermined range distance of the handheld imaging device 100.

Figure 2A:
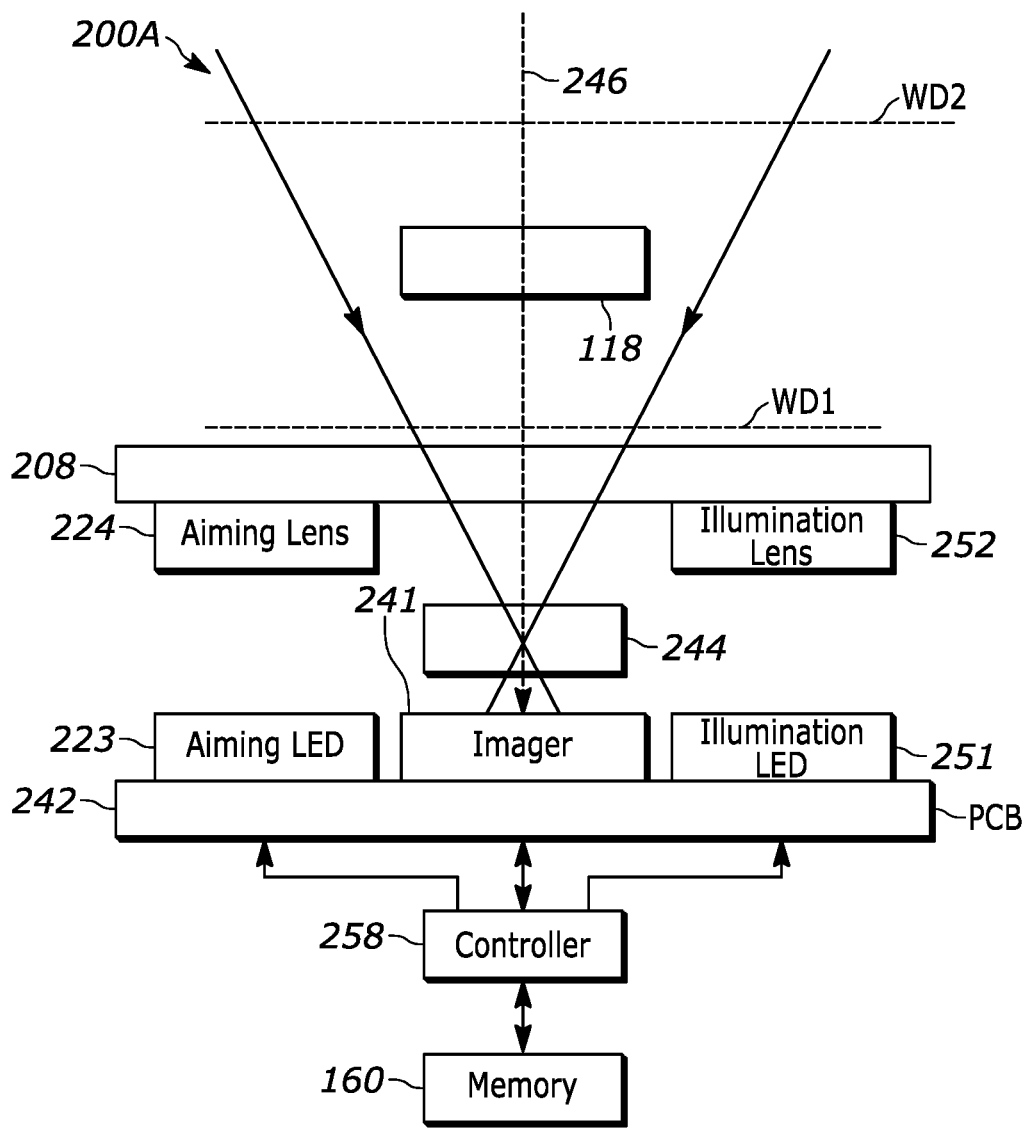
FIG. 2A illustrates a block diagram of an example imaging device such as the example handheld barcode reader of FIG. 1A.

Referring next to FIG. 2A, a block diagram of an example architecture for an imaging device such as handheld imaging device 100 is shown. For at least some of the reader implementations, an imaging assembly 245 includes a light-detecting sensor or imager 241 operatively coupled to, or mounted on, a printed circuit board (PCB) 242 in the imaging device 200A as shown in FIG. 2A. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes the barcode reading module 120 (e.g., a monochromatic imaging sensor) of FIGS. 1A-1C. In further implementations, the imager 241 additionally or alternatively is or includes the vision camera 155 (e.g., a color imaging sensor) of FIGS. 1A-1C. It will be understood that, although imager 241 is depicted in FIG. 2A as a single block, that imager 241 may be multiple sensors spread out in different locations of imaging device 200A.

The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an implementation, WD1 is about one-half inch from the window 208, and WD2 is about thirty inches from the window 208.

An illuminating light assembly may also be mounted in, attached to, or associated with the imaging device 200A. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 118 to be imaged by image capture. Although FIG. 2A illustrates a single illumination light source 251, it will be understood that the illumination light source 251 may include more light sources. At least part of the scattered and/or reflected return light is derived from the illumination pattern of light on and along the object 118.

An aiming light assembly may also be mounted in, attached to, or associated with the imaging device 200A and preferably includes an aiming light source 223, e.g., one or more aiming LEDs or laser light sources, and an aiming lens 224 for generating and directing a visible aiming light beam away from the imaging device 200A onto the object 118 in the direction of the FOV of the imager 241.

Further, the imager 241, the illumination source 251, and the aiming source 223 are operatively connected to a controller or programmed microprocessor 258 operative for controlling the operation of these components. Depending on the implementation, the microprocessor 258 is the controller 170 as described above with regard to FIGS. 1A-1C. In some implementations, the microprocessor 258 functions as or is communicatively coupled to a vision application processor for receiving, processing, and/or analyzing the image data captured by the imagers.

A memory 160 is connected and accessible to the controller 258. Preferably, the microprocessor 258 is the same as the one used for processing the captured return light from the illuminated object 118 to obtain data related to the object 118. Though not shown, additional optical elements, such as collimators, lenses, apertures, compartment walls, etc. may be provided in the housing. Although FIG. 2A shows the imager 241, the illumination source 251, and the aiming source 223 as being mounted on the same PCB 242, it should be understood that different implementations of the imaging device 200A may have these components each on a separate PCB, or in different combinations on separate PCBs. For example, in an implementation of the imaging device 200A, the illumination LED source is provided as an off-axis illumination (i.e., has a central illumination axis that is not parallel to the central FOV axis).

In some implementations, the object 118 is or includes an indicia for decoding (e.g., a decode indicia), such as a barcode, a QR code, a label, a UPC code, a digital matrix code, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200A.

Figure 2B:
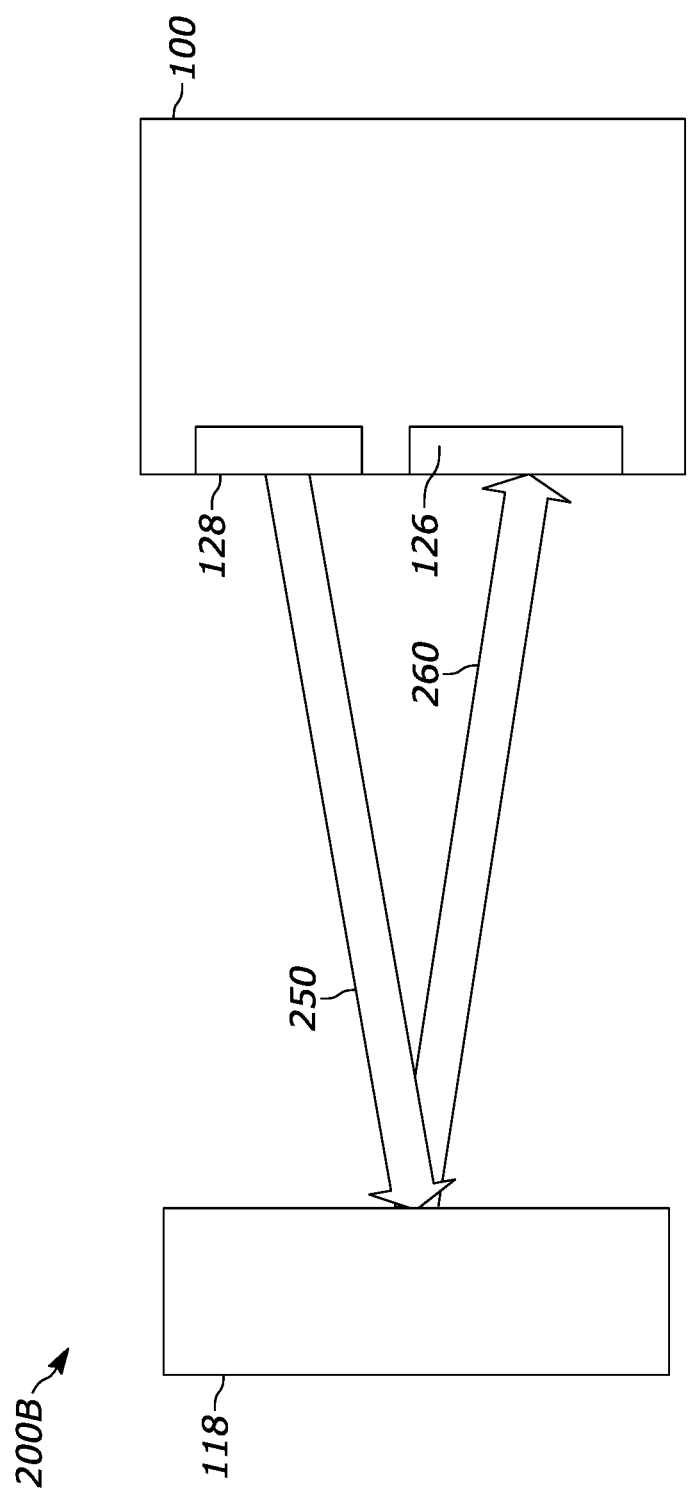
FIG. 2B illustrates a block diagram of an example imaging device such as the example handheld barcode reader of FIG. 1A performing a time-of-flight measurement.

FIG. 2B is a simplified block diagram of a system 200B using the handheld imaging device 100 of FIG. 1 to project light toward an object 118, in accordance with implementations described herein. The handheld imaging device 100 may include an illumination light source 128 and one or more sensors 126 as described with regard to FIG. 1 above.

The handheld imaging device 100 projects light 250 from the illumination light source 128 towards an object 118. Depending on the implementation, the object 118 may be a variable distance away from the handheld imaging device 100. For example, the object may be 1 inch away, 6 inches away, 1 foot away, 2 feet away, 4 feet away, 8 feet away, 30 feet away, etc. In such implementations, the handheld imaging device 100 may determine to perform one or more operations responsive to determining the distance using the techniques described herein.

In some implementations, the handheld imaging device 100 projects the light 250 in response to an indication from a user, such as a trigger pull, button push, spoken command, etc. In further implementations, the handheld imaging device 100 projects the light 250 in response to an indication from a user via a computing device. In still further implementations, the handheld imaging device 100 projects the light 250 in response to detecting or receiving an indication of an object 118, detecting an indication of a label, decoding data from a bar code or RFID tag associated with the object, etc.

In some implementations, the handheld imaging device 100 includes a single illumination source 128, and therefore projects light according to the capabilities of the illumination source 128 (e.g., a particular color light, white light, UV light, etc.). In further implementations, the handheld imaging device 100 includes multiple or variable illumination sources 128. In some such implementations, the handheld imaging device 100 determines the wavelength of light to project based on an indication such as an input from a user to the handheld imaging device 100, an input from a user via a computing device, etc.

The projected light 250 travels at a speed v over a distance d from the device to the surface. In a vacuum, the speed v is the speed of light, c≈299,792,458 m/s. In air, the speed is slightly lower, v=c/n, where n is the index of refraction for air, approximately 1.0003. In some implementations, the system 200 assumes that operations occur in air rather than a vacuum or other medium unless the handheld imaging device 100 receives an indication to the contrary (e.g., from the user). In further implementations, the projected light 250 has a duration f (which may vary with certain modulation schemes), and a travel time from the device to the surface of $T_I$.

Upon receiving the projected light 250 from the handheld imaging device 100, the object 118 reflects at least some of the light as reflected light 260. In some implementations, because the time for the light to reflect is very short (e.g., on the order of $10^{-17}$ seconds), the handheld imaging device 100 treats the time to reflect as $T_B \approx 0$ for any calculations. The reflected light 260 returns from the object 118 to the handheld imaging device 100. In particular, the reflected light 260 impacts with a sensor 126 of the handheld imaging device 100. Depending on the implementation, the reflected light 260 may follow the same path or substantially the same path as the projected light 250, and thus the travel time $T_R \approx T_I$.

In some implementations, the total time of travel (e.g., also referred to as time of flight (TOF)) is given by equation 1 as follows: $T_{Tr}=T_I+T_B+T_R$. The total time of travel may also be equal to the overall phase shift for the reflection of the light with measured illuminations $Q_1$, $Q_2$, $Q_3$, $Q_4$. As such, the total time of travel is also given by equation 2 as follows:

$$T_{Tr} = \frac{\phi}{2\pi f},$$

where $$\tan(\phi) = \frac{Q_3 - Q_4}{Q_1 - Q_2}.$$

Since $T_I \approx T_R$ and $$T_B \approx 0, \quad \frac{\arctan\left(\frac{Q_3 - Q_4}{Q_1 - Q_2}\right)}{2\pi f} \approx T_R + 0 + T_R.$$

As such, the time of travel for the reflected light is given by equation 3:

$$T_R \approx \frac{\arctan\left(\frac{Q_3 - Q_4}{Q_1 - Q_2}\right)}{4\pi f},$$

and the distance is given by equation 4:

$$d = vt = \frac{c}{n} \frac{\arctan\left(\frac{Q_3 - Q_4}{Q_1 - Q_2}\right)}{4\pi f}$$

for the reflected light 260.

Depending on the implementation, timing relationships between certain components of the handheld imaging device 100 such as the sensor assembly 126, the clock circuit, optics, processor 118, etc. may vary based on the temperature of the components, or timing aspects of system 100 may vary based on temperature. Such timing variations may cause inaccuracy in determining distances using the above calculations. These calculations may be adjusted by experimentally determining temperature adjustment factors that vary by temperature, determining an operational temperature for the system, and applying the temperature dependent temperature adjustment factors when calculating distance (or, for example TOF) by a ranging algorithm. The operational temperature may be measured by a temperature circuit of the handheld imaging device 100, a thermistor of an illumination device system, received by the handheld imaging device 100 via a networking interface, imaged by the sensor assembly from a visual indicator on an object label or thermometer, or via other means.

Figure 3:
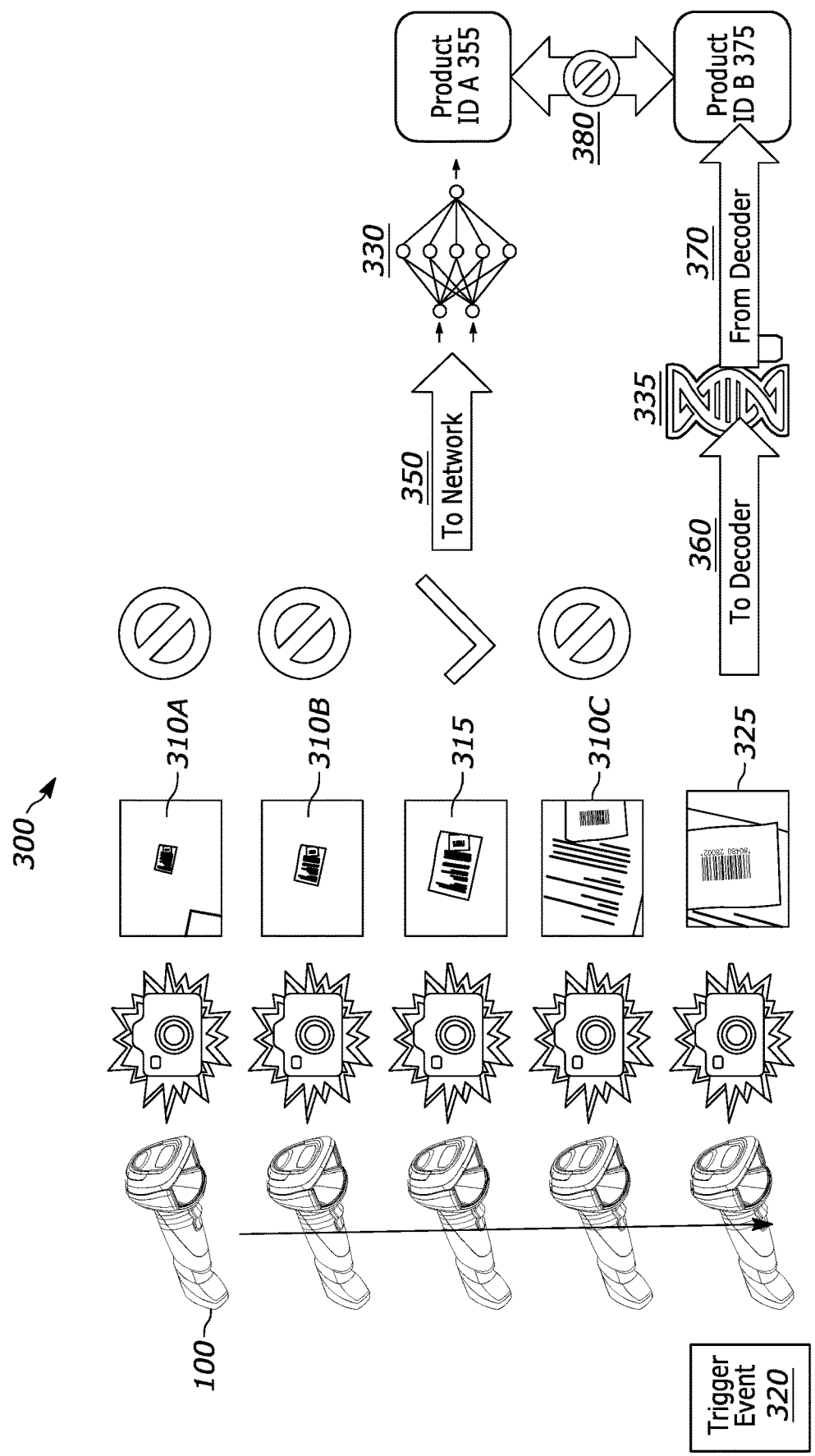
FIG. 3 illustrates an example scenario in which a user moves a handheld imaging device towards an object to decode a barcode, and the system detects that the object and the applied barcode do not match.

Referring to FIG. 3, a scenario 300 in which a user moves a handheld imaging device towards an object to perform a decode event is illustrated. In particular, a handheld imaging device 100 is moved toward an object 118 and a trigger event 320 occurs, causing the handheld imaging device 100 to capture a decode image 325 to use in decoding an indicia present on the object 118. As the object 118 moves within a predetermined threshold distance of the handheld imaging device 100, the handheld imaging device 100 automatically begins capturing images 310A-C, 315, and 325 of the object 118. Depending on the implementation, the predetermined threshold distance may be 6 inches, 12 inches, 24 inches, etc. In further implementations, the predetermined threshold distance may include an end distance where the handheld imaging device 100 stops capturing images if the object 118 gets too close to the handheld imaging device 100 (e.g., 6 inches, 3 inches, 1 inch, etc.).

The handheld imaging device 100 may, depending on the implementation, capture multiple images 310A-C unsuitable for image processing (e.g., not enough of the object 118 in the frame, the object 118 takes up too little of the image, the image is blurry, etc.). The handheld imaging device 100 also, in the exemplary implementation of FIG. 3, captures an image 315 for additional processing. The handheld imaging device 100 transmits 350 the image 315 to a model 330 for identification. Depending on the implementation, the model 330 may be and/or include a deep learning network, a deep neural network (DNN), an artificial neural network (ANN), a convolutional neural network (CNN), an image-understanding system (IUS), or some other such model capable of computer vision and/or object recognition techniques. In some implementations, the model 330 may be a pre-trained model trained on anonymized and/or historical data. In further implementations, the handheld imaging device 100 trains the model 330 using the images 315, 325, and/or 310A-C as well as the identifications 355 and 375 and/or the comparison 380. The model 330 then determines a product identification 355 (also referred to as product ID A 355) using the image 315.

Although the methods described elsewhere herein may not directly mention machine learning techniques, such methods may be read to include such machine learning for any determination or processing of data that may be accomplished using such techniques. In some implementations, the handheld imaging device 100 may implement such machine-learning techniques automatically upon occurrence of certain events or upon certain conditions being met (e.g., taking image 315, receiving the product ID A 355, taking image 325, receiving product ID B 375, generating comparison 380, etc.). Use of machine learning techniques, as described herein, may begin with training a machine learning program, or such techniques may begin with a previously trained machine learning program.

A processor or a processing element of handheld imaging device 100 may be trained using supervised or unsupervised machine learning, and the machine learning program may employ a neural network (e.g., network 330 or another neural network), which may be a convolutional neural network, a deep learning neural network, or a combined learning module or program that learns in two or more fields or areas of interest. Machine learning may involve identifying and recognizing patterns in existing identification data (e.g., images used for identification, actual identifications, comparisons between identifications, etc.) in order to facilitate making predictions for subsequent identification data. Models may be created based upon example inputs of data in order to make valid and reliable predictions for novel inputs.

The machine learning programs may utilize deep learning algorithms that are primarily focused on pattern recognition, and may be trained after processing multiple examples. The machine learning programs may include Bayesian program learning (BPL), image or object recognition, optical character recognition, and/or other similar techniques, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs.

The handheld imaging device 100 also captures a decode image 325. In the exemplary implementation of FIG. 3, the handheld imaging device 100 captures the decode image 325 responsive to a trigger event 320, such as a trigger pull, a button press, a digital indication, a voice command, etc. After capturing the decode image 325, the handheld imaging device 100 transmits 360 the decode image 325 to a decoder module 335, which decodes and determines 370 a product identification 375 (also referred to as product ID B 375) using the decode image. The handheld imaging device 100 then compares 380 the product ID A 355 and product ID B 375 to determine whether the two identifications match. In some implementations, the handheld imaging device 100 additionally or alternatively determines whether one or more broader tags (e.g., item types, item shapes, item sizes, etc.) match. For example, product ID A 355 may indicate that the object 118 is a book, while product ID B 375 may be a particular novel. In such an implementation, the handheld imaging device 100 may determine that product ID A 355 and product ID B 375 match despite being slightly different, as both include a category identifier tag for book.

Figure 4:
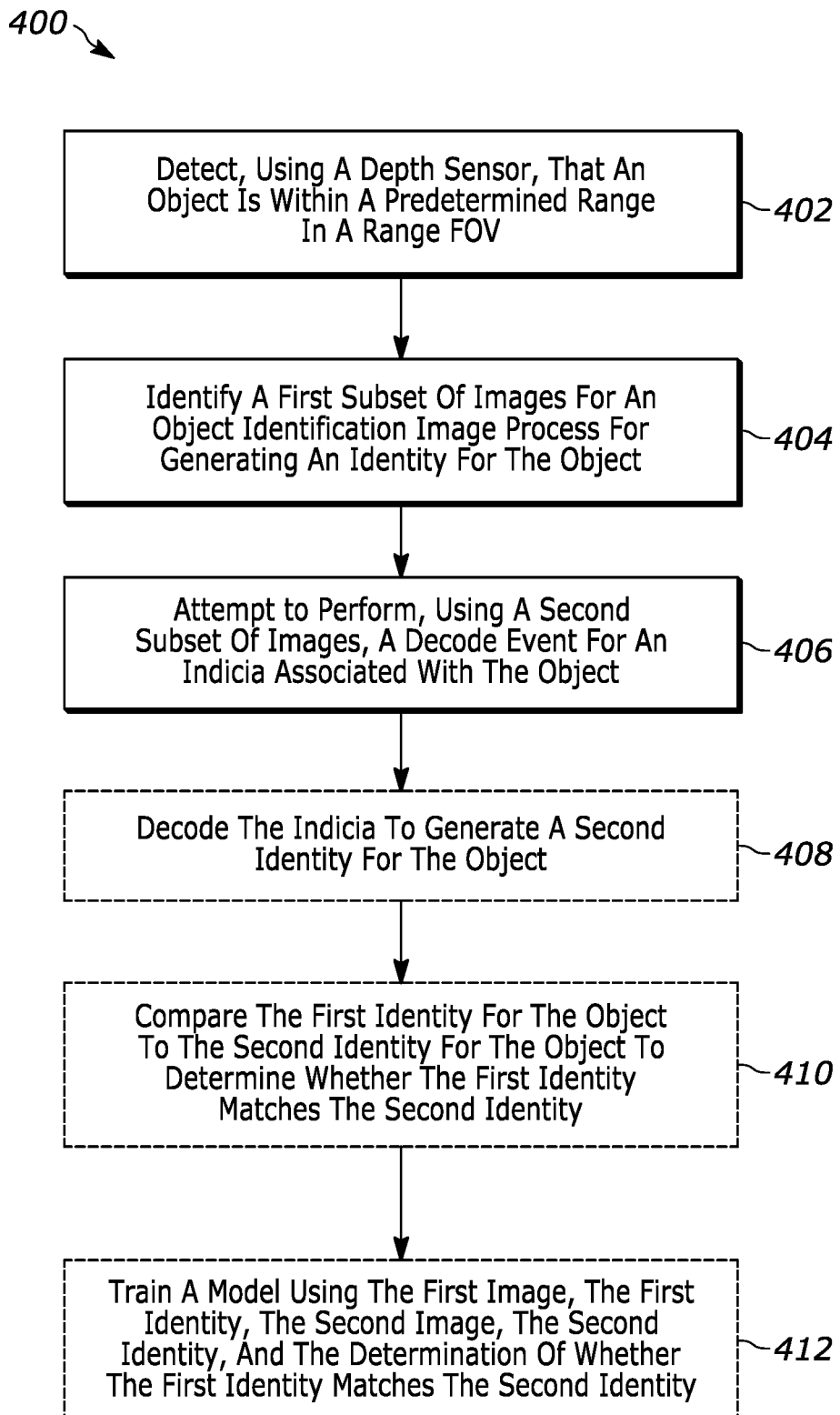
FIG. 4 illustrates a flow diagram of an example method for capturing images for vision and indicia decode applications in a non-fixed environment.

Referring next to FIG. 4, the method 400 illustrates a flow diagram of an example method for capturing images for vision and indicia decode applications in a non-fixed environment. Although the method 400 is described below with regard to imaging device 200A and components thereof as illustrated in FIG. 2A, it will be understood that other similarly suitable (e.g., mobile) imaging devices and/or components may be used instead.

At block 402, the imaging device 200A detects, using a depth sensor (e.g., such as a time of flight (TOF) range sensor), that an object 118 is within a predetermined range in a range FOV. In some implementations, the imaging device 200A, begins capturing images responsive to detecting that the object is within the predetermined range. In some implementations, the imaging device 200A captures images at a set frequency (e.g., capturing 60 images per second) from when the imaging device 200A detects the object within the range until a user attempts to trigger a decode event (e.g., by pulling a trigger). In further implementations, the imaging device 200A captures images at a set frequency so long as the imaging device 200A continues to detect that the object 118 is present within the predetermined range. In some such implementations, the imaging device 200A measures the distance between the object 118 and the imaging device 200A at a set frequency (e.g., once per second) and continues capturing images until the imaging device 200A no longer detects the object 118 in the range.

Depending on the implementation, the imaging device 200A may detect that an object 118 is within the predetermined range when any of: a series of pixels (e.g., with resolution at 8×8, 64×64, etc.) of an image stream (e.g., from a video camera) are representative of the object within the predetermined range, a contiguous series of pixels of an image stream are representative of the object within the predetermined range, a predetermined number of pixels are determined to be present when a range threshold is met, etc. In further implementations, the imaging device 200A is already capturing images via one or more imagers of the device. In such implementations, the imaging device 200A may further base a detection off of a parallax distance for the object between a 2D imager (e.g., the barcode module 120) and a 3D imager (e.g., the vision camera 155). For example, the imaging device 200A may identify where in the FOV for the 3D imager an object would appear within the FOV for the 2D imager. Upon determining the location in the 2D imager, the imaging device 200A may activate the depth sensor to determine the distance before beginning to store captured images.

In some implementations, the imaging device 200A considers only the center of the depth FOV in determining the distance for the object 118. In further implementations, the imaging device 200A considers a range surrounding the center of the FOV (e.g., according to a parallax offset for the imaging device 200A when appropriate). In still further implementations, the imaging device 200A identifies a region of contiguous pixels as described above surrounding the center of the depth FOV for calculating the distance between the imaging device 200A and the object 118. Similarly, the imaging device 200A may perform a calibration upon startup and/or upon manufacture to determine where to consider for determining the distance between the imaging device 200A and the object 118.

In some implementations, the imaging device 200A automatically captures images and/or a stream prior to the object 118 entering the predetermined range and only begins storing the images after the object 118 enters the predetermined range. For example, the imaging device 200A may include a cradle, charging station, holding station, etc. Upon a user removing the imaging device 200A from the cradle, the imaging device 200A may automatically begin streaming and/or capturing images.

In some implementations, the imaging device 200A stores one or more of the captured images in a buffer storage prior to a user initiating a trigger event to decode the indicia (e.g., pulling a physical trigger, pushing a button, inputting a command, etc.). In some such implementations, the imaging device 200A uses one or more of the images stored in the buffer storage at blocks 404 and/or 406 for additional image processing (e.g., for an object identification image process) and/or decoding an indicia as described in more detail below. Depending on the implementation, the captured images may have a pixel resolution of 32×32, 64×64, 128×128, etc.

At block 404, the imaging device 200A identifies a first subset of images for an object identification image process for generating an identity for the object. In particular, the imaging device 200A may select one or more captured images to store and on which perform processing tasks and/or analysis responsive to determining that the object is within a predetermined range of the imaging device 200A (e.g., as determined in block 402 above). For example, in some implementations, the imaging device 200A selects one or more images in which the entire object 118 is visible. In further implementations, the imaging device 200A selects one or more images in which an identifiable portion of the object 118 is visible. In still further implementations, the imaging device 200A selects any and/or all images captured while the object 118 is within the predetermined range.

Depending on the implementation, the imaging device 200A may queue images in the first subset of images for analysis in case analysis of the first image fails (e.g., the imaging device 200A or an associated computing device is unable to process the image properly and/or fails to use the image for the appropriate machine vision application). In further implementations, the imaging device 200A analyzes each image in the first subset of images regardless of whether a first image analysis fails.

In some implementations, the object identification image process is to generate an identity for the object. In particular, the object identification image process may include using a trained (e.g., via machine learning or other artificial intelligence techniques) object recognition algorithm. Further, the object identification image process may be performed by a neural network (e.g., such as network 330 described with regard to FIG. 3 above). Depending on the implementation, the network performing the object identification image process may include a convolutional neural network (CNN), deep neural network (DNN), artificial neural network (ANN), image-understanding system (IUS), and/or any other similar network model allowing for a user to implement various computer vision and object recognition techniques.

At block 406, the imaging device 200A attempts to perform, using a second subset of images, a decode event for an indicia associated with the object. In particular, the imaging device 200A may determine to perform a decode event responsive to detecting a decode indicia in a captured image. Depending on the implementation, an indicia may be and/or include a barcode, a QR code, an RFID tag, a chemical indicator, etc. In further implementations, the imaging device 200A determines to perform a decode event responsive to a trigger event from a user (e.g., such as a trigger pull, a button press, a digital indication, etc.).

In some implementations, the imaging device 200A determines not to perform a decode event if a predetermined length of time passes between the object 118 entering the predetermined range without a trigger event occurring. In further implementations, the imaging device 200A determines not to perform a decode event if the object 118 exits the predetermined range without a trigger event occurring. In still other implementations, the imaging device 200A determines not to perform a decode event if the imaging device 200A does not capture an image of object 118 including a decode indicia.

Depending on the implementation, the imaging device 200A may alert a user, an employee, or another individual associated with the imaging device 200A responsive to the determination not to perform the decode event. For example, when the imaging device 200A determines not to perform the decode event, the imaging device 200A may further determine that the individual scanning objects is sweethearting, scan avoidance, and/or otherwise preventing the decode indicia from being captured. As such, the imaging device 200A may send an alert (e.g., a textual alert, an auditory alert, a visual alert, etc.) to a manager or employee. In other implementations, the imaging device 200A may provide an alert to the user that the barcode was not properly read before transmitting an alert if the item is not rescanned with a predetermined time period, or if a different item is identified.

It will be understood that, although the flow diagram of method 400 depicts block 406 occurring after block 404, the imaging device 200A may perform block 406 prior to performing block 404.

At block 408, the imaging device 200A may, depending on the implementation, decode the indicia to generate a second identity for the object 118. In some implementations, the imaging device 200A decodes the indicia of an image captured responsive to a trigger event (e.g., pulling a trigger, pressing a button, providing a digital indication, etc.). In further implementations, the imaging device 200A determines that such an image is unsuitable for a decode event (e.g., the indicia is blurry or not fully in the frame). In some such implementations, the imaging device 200A checks other images captured prior to a trigger event for an image suitable for the decode event. The other images captured prior to the trigger event may be images captured responsive to the object 118 entering the predetermined range and/or may be stored in a temporary buffer data storage to be cleared after completing the decode event and/or analysis as discussed herein. For example, the imaging device 200A may stored images captured in a temporary buffer and, upon determining that a decode indicia is not visible or upon failing to decode such a decode indicia, the imaging device 200A may determine to use one of the stored images for a decode event instead.

At block 410, the imaging device 200A may, depending on the implementation, compare the first identity for the object to the second identity for the object to determine whether the first identity matches the second identity. In some such implementations, when the first identity and the second identity do not match, the imaging device 200A may generate an alert for a user, employee, manager, and/or other individual associated with the imaging device 200A. Depending on the implementation, the alert may be a textual alert (e.g., a notification to a user to rescan the object 118), an audio alert (e.g., a beeping noise), a visual alert (e.g., a flash or change in color of light), etc. In some such implementations, the imaging device 200A may generate the alert after a predetermined number or percentage of objects determined to have mismatching identities.

In some implementations, the imaging device 200A determines that ticket switching (e.g., replacing one decode indicia with another decode indicia) occurs when the object 118 has a mismatching first identity and second identity. In some such implementations, the imaging device 200A generates an alert responsive to the determination that ticket switching or some other attempt to fool the system occurs. For example, if a FOV of the imaging device 200A is blocked and captures all black frames for a predetermined period of time and/or predetermined number of frames, the imaging device 200A may similarly generate an alert.

At block 412, the imaging device 200A may, depending on the implementation, train a machine learning model using at least some of the first image, the first identity, the second image, the second identity, and/or the determination of whether the first identity matches the second identity. In some implementations, the imaging device 200A trains the machine learning model to determine the range threshold in which the imaging device 200A successfully identifies the object 118. In further implementations, the imaging device 200A trains the machine learning model to detect when ticket switching, sweethearting, scan avoidance, etc. occurs. In still further implementations, the imaging device 200A trains the machine learning model to identify characteristics of captured images to use for image processing and/or decoding. Depending on the implementation, the imaging device 200A and/or a user may label the input data and pre-qualify which data is used to train the imaging device 200A (e.g., only matching sets, only mismatching sets, only sets where a decode event is performed, only sets where the decode event is not performed, etc.).

Figure 5:
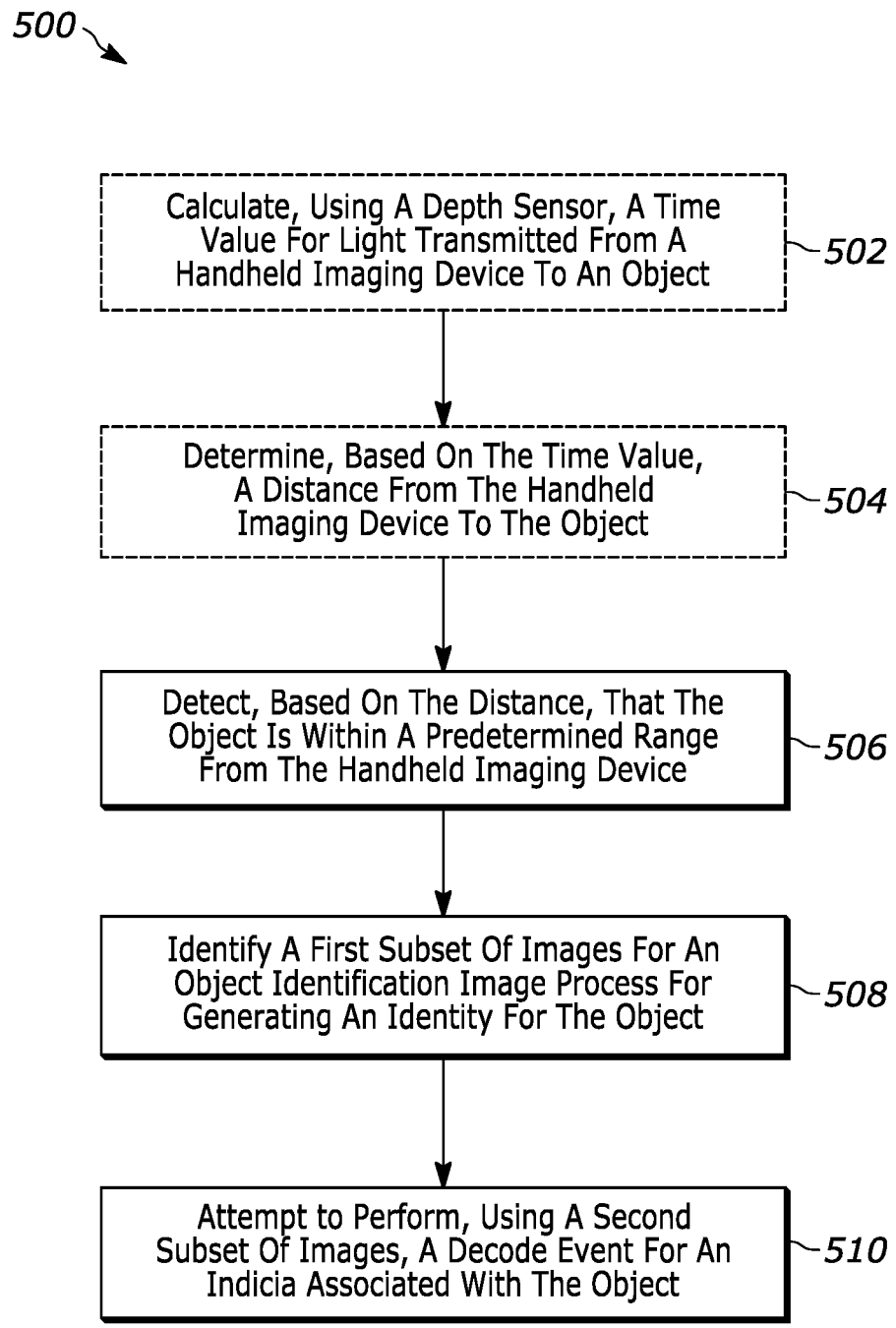
FIG. 5 illustrates a flow diagram of an example method for determining a distance between a handheld imaging device and an object for capturing images in a non-fixed environment.

Referring next to FIG. 5 the method 500 illustrates a flow diagram of another example method for capturing images for vision and indicia decode applications in a non-fixed environment. Although the method 500 is described below with regard to imaging device 200A and components thereof as illustrated in FIG. 2A, it will be understood that other similarly suitable (e.g., mobile) imaging devices and/or components may be used instead.

At block 502, the imaging device 200A calculates, using a depth sensor (e.g., a time of flight (TOF) range sensor), a time value (e.g., a TOF value) for light transmitted from the imaging device 200A to an object 118. In some implementations, the depth sensor calculates the time value by recording a first time and a second time according to an internal clock/timer, where the first time is a time at which the imaging device 200A emits light and the second time is a time at which the imaging device 200A receives reflected light from the object 118. In further implementations, the imaging device 200A starts a timer when emitting light and only records the second time (e.g., when the imaging device 200A receives the reflected light). In further implementations, the imaging device 200A calculates the time value based on a phase shift of the light, as described in more detail with regard to FIG. 2B above.

At block 504, the imaging device 200A determines, based on the time value, a distance from the imaging device 200A to the object 118. In implementations, in which the time value represents the total time for light to travel from the imaging device 200A to the object 118 and back, the imaging device 200A may assume that the time to travel each way is approximately equal and the time to reflect is negligible, and therefore calculates the distance between the imaging device 200A and the object 118 by multiplying half of the time value calculated above by the speed of light $c \approx 299,792,458$ m/s. In implementations in which the imaging device 200A calculates the time value as representing the distance to or from the imaging device 200A and the object 118, the imaging device 200A multiplies the entirety of the time value calculated above by the speed of light.

In some implementations, the imaging device 200A performs blocks 506, 508, and/or 510 similarly to blocks 402, 404, and/or 406 of FIG. 4, respectively. As such, the various implementations for the imaging device discussed herein with regard to blocks 402, 404, and/or 406 may similarly apply as appropriate to the imaging device 200A while performing blocks 506, 508, and/or 510.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A handheld imaging device for capturing and processing images for vision applications in a non-fixed environment, the handheld imaging device comprising:
a housing;
a depth sensor operable to detect that an object in a range field of view (FOV) of the depth sensor is within a predetermined range from the handheld imaging device;
an imaging sensor at least partially disposed within the housing and operable to capture images of the object within an imaging FOV of the imaging sensor;
one or more processors; and
a computer-readable media storing machine readable instructions that, when executed, cause the one or more processors to:
detect, using the depth sensor, that the object is within the predetermined range in the range FOV;
responsive to detecting that the object is within the predetermined range, identify a first subset of images in a plurality of images captured by the imaging sensor for an object identification image process for generating an identity for the object, wherein identifying the first subset of images is based on whether the object is within the predetermined range for each of the plurality of images; and
after the detecting, attempt to perform, using a second subset of images in the plurality of images, a decode event for an indicia associated with the object, the indicia visible in the imaging FOV for the second subset of images.

2. The handheld imaging device of claim 1, wherein:
the identity for the object is a first identity for the object;
the object identification image process includes analyzing a first image of the first subset of images to generate the first identity for the object; and
the computer-readable media further stores instructions that, when executed, cause the one or more processors to:
decode the indicia to generate a second identity for the object, the indicia visible in a second image of the second subset of images; and
compare the first identity for the object to the second identity for the object to generate a determination of whether the first identity matches the second identity.

3. The handheld imaging device of claim 2, wherein the computer-readable media further stores instructions that, when executed, cause the one or more processors to:
responsive to determining that the first identity does not match the second identity, provide an alert to a user associated with the handheld imaging device.

4. The handheld imaging device of claim 2, wherein the second image is captured responsive to a trigger event and the first image is captured prior to the trigger event.

5. The handheld imaging device of claim 4, wherein the first image is captured responsive to the detecting that the object is within the predetermined range and the computer-readable media further stores instructions that, when executed, cause the one or more processors to:
store, in a buffer of the handheld imaging device, the first image after the first image is captured;
wherein the object identification image process is responsive to the trigger event.

6. The handheld imaging device of claim 2, wherein a third image is captured responsive to a trigger event, the first image and the second image are captured prior to the trigger event, and the computer-readable media further stores instructions that, when executed, cause the one or more processors to:
store, in a buffer of the handheld imaging device, the first image after the first image is captured and the second image after the second image is captured;
wherein the object identification image process is responsive to the trigger event.

7. The handheld imaging device of claim 1, wherein the identity for the object is a first identity for the object and the object identification image process includes:
analyzing a first image of the first subset of images to generate the first identity for the object; and
the computer-readable media further stores instructions that, when executed, cause the one or more processors to:
determine that a second identity for the object is not generated from the decode event or will not be generated from the decode event.

8. The handheld imaging device of claim 7, wherein the computer-readable media further stores instructions that, when executed, cause the one or more processors to:
responsive to determining that the second identity is not generated or will not be generated, provide an alert to a user associated with the handheld imaging device.

9. The handheld imaging device of claim 1, wherein the computer-readable media further stores instructions that, when executed, cause the one or more processors to:
decode the indicia to generate the identity for the object.

10. The handheld imaging device of claim 1, wherein the object identification image process includes:
transmitting the first subset of images to a computing device for training a machine learning model.

11. The handheld imaging device of claim 2, wherein the computer-readable media further stores instructions that, when executed, cause the one or more processors to:
transmit the first image, the first identity, the second image, the second identity, and the determination of whether the first identity matches the second identity to a computing device for training a machine learning model.

12. The handheld imaging device of claim 1, wherein detecting that the object is within the predetermined range includes:
determining that a predetermined number of pixels in the range FOV satisfy a predetermined range value threshold.

13. The handheld imaging device of claim 12, wherein the predetermined number of pixels in the range FOV is a predetermined number of contiguous pixels in the range FOV.

14. The handheld imaging device of claim 1, wherein the computer-readable media further stores instructions that, when executed, cause the one or more processors to:
  identify a location in the range FOV where the object would enter the imaging FOV;
  wherein the detecting that the object is within the predetermined range is responsive to detecting a presence of the object in the location.

15. The handheld imaging device of claim 1, wherein detecting that the object is within the predetermined range includes:
  calculating, using the depth sensor, a time of flight (TOF) value for light transmitted from the handheld imaging device to the object; and
  determining, based on the TOF value, a distance from the handheld imaging device to the object.

16. A method for capturing and processing images for vision applications in a non-fixed environment, the method comprising:
  detecting, by one or more processors and using a depth sensor associated with a handheld imaging device, that an object in a range field of view (FOV) of the depth sensor is within a predetermined range from the handheld imaging device;
  responsive to the detecting, identifying, by the one or more processors, a first subset of images in a plurality of images captured by an imaging sensor for an object identification image process for generating an identity for the object, the identifying based on whether the object is within the predetermined range for each of the plurality of images, the imaging sensor operable to capture an image of the object within an imaging FOV of an imaging sensor; and
  after the detecting, attempting, by the one or more processors, to perform, using a second subset of images in the plurality of images, a decode event for an indicia associated with the object, the indicia visible in the imaging FOV for the second subset of images.

17. The method of claim 16, wherein:
  the identity for the object is a first identity for the object;
  the object identification image process includes analyzing a first image of the first subset of images to generate the first identity for the object; and
  the method further comprising:
    decoding the indicia to generate a second identity for the object, the indicia visible in a second image of the second subset of images; and
    comparing the first identity for the object to the second identity for the object to generate a determination of whether the first identity matches the second identity.

18. The method of claim 2, the method further comprising:
  responsive to determining that the first identity does not match the second identity, providing an alert to a user associated with the handheld imaging device.

19. The method of claim 17, wherein the second image is captured responsive to a trigger event and the first image is captured prior to the trigger event.

20. The method of claim 19, wherein the first image is captured responsive to the detecting that the object is within the predetermined range, the method further comprising:
  storing, in a buffer of the handheld imaging device, the first image after the first image is captured;
  wherein the object identification image process is responsive to the trigger event.

21. The method of claim 17, wherein a third image is captured responsive to a trigger event and the first image and the second image are captured prior to the trigger event, the method further comprising:
  storing, in a buffer of the handheld imaging device, the first image after the first image is captured and the second image after the second image is captured;
  wherein the object identification image process is responsive to the trigger event.

22. The method of claim 16, wherein the identity for the object is a first identity for the object and the object identification image process includes:
  analyzing a first image of the first subset of images to generate the first identity for the object; and
  the method further comprising:
    determining that a second identity for the object is not generated from the decode event or will not be generated from the decode event.

23. The method of claim 22, the method further comprising:
  responsive to determining that the second identity is not generated or will not be generated, providing an alert to a user associated with the handheld imaging device.

24. The method of claim 16, the method further comprising:
  decoding the indicia to generate the identity for the object.

25. The method of claim 16, wherein the object identification image process includes:
  transmitting the first subset of images to a computing device for training a machine learning model.

26. The method of claim 17, the method further comprising:
  transmitting the first image, the first identity, the second image, the second identity, and the determination of whether the first identity matches the second identity to a computing device for training a machine learning model.

27. The method of claim 16, wherein detecting that the object is within the predetermined range includes:
  determining that a predetermined number of pixels in the range FOV satisfy a predetermined range value threshold.

28. The method of claim 27, wherein the predetermined number of pixels in the range FOV is a predetermined number of contiguous pixels in the range FOV.

29. The method of claim 16, the method further comprising:
  identifying a location in the range FOV where the object would enter the imaging FOV;
  wherein the detecting that the object is within the predetermined range is responsive to detecting a presence of the object in the location.

30. The method of claim 16, wherein detecting that the object is within the predetermined range includes:
  calculating, using the depth sensor, a time of flight (TOF) value for light transmitted from the handheld imaging device to the object; and
  determining, based on the TOF value, a distance from the handheld imaging device to the object.

* * * * *